US008467935B2

(12) United States Patent
Boissiere

(10) Patent No.: US 8,467,935 B2
(45) Date of Patent: Jun. 18, 2013

(54) AUTOMOBILE ELECTRONIC CONTROL UNIT COMPRISING A VOLTAGE STEP-UP DEVICE AND CONTROL METHOD

(75) Inventor: Philippe Boissiere, Pinsaguel (FR)

(73) Assignee: Continental Automotive France, Toulouse (FR)

( * ) Notice: Subject to any disclaimer, the term of this patent is extended or adjusted under 35 U.S.C. 154(b) by 0 days.

(21) Appl. No.: 13/202,634

(22) PCT Filed: Feb. 3, 2010

(86) PCT No.: PCT/EP2010/000645
§ 371 (c)(1),
(2), (4) Date: Aug. 22, 2011

(87) PCT Pub. No.: WO2010/094397
PCT Pub. Date: Aug. 26, 2010

(65) Prior Publication Data
US 2011/0301811 A1 Dec. 8, 2011

(30) Foreign Application Priority Data
Feb. 20, 2009 (FR) ..................................... 09 00771

(51) Int. Cl.
*G60F 7/00* (2006.01)
(52) U.S. Cl.
USPC .......................................... 701/36; 701/34.4
(58) Field of Classification Search
USPC .................. 701/36, 34.4, 22, 51; 363/65, 97,
363/21.01; 290/43; 323/268, 282; 326/86
See application file for complete search history.

(56) References Cited

U.S. PATENT DOCUMENTS

| 5,844,786 | A * | 12/1998 | Yoshida et al. | 363/21.01 |
| 6,885,568 | B2 * | 4/2005 | Kernahan et al. | 363/97 |
| 6,897,683 | B2 * | 5/2005 | Kernahan et al. | 326/86 |
| 6,909,266 | B2 * | 6/2005 | Kernahan et al. | 323/282 |
| 7,157,889 | B2 * | 1/2007 | Kernahan et al. | 323/268 |
| 7,429,802 | B2 * | 9/2008 | Mukai et al. | 290/43 |
| 2003/0095421 | A1 * | 5/2003 | Kadatskyy et al. | 363/65 |

FOREIGN PATENT DOCUMENTS
EP   1 557 561 A1   7/2005
WO   WO-2004/005705 A1 *  7/2005

OTHER PUBLICATIONS

International Search Report, dated Jun. 8, 2010, from corresponding PCT application.

* cited by examiner

*Primary Examiner* — Thomas Black
*Assistant Examiner* — Robert Payne
(74) *Attorney, Agent, or Firm* — Young & Thompson

(57) ABSTRACT

An electronic control unit (3) for a motor vehicle includes a microcontroller (30) which controls the operation of an engine of the motor vehicle, a regulator (31) of a voltage delivered to the microcontroller (30) by an electric power source (2), and a voltage step-up device (32) including control elements (321) suitable for activating at least one inductive load (320) coupled to the power source (2), an activation which consists of successive energy accumulations and discharges by the at least one inductive load. The at least one inductive load (320) is shared with at least one second device (4) that is internal or external to the electronic control unit (3), a second device whose operation is controlled by the electronic control unit. A method for controlling at least one inductive load (320) coupled to an electric power source (2) of a motor vehicle is also described.

7 Claims, 1 Drawing Sheet

AUTOMOBILE ELECTRONIC CONTROL UNIT COMPRISING A VOLTAGE STEP-UP DEVICE AND CONTROL METHOD

The present invention belongs to the field of automobile electronic control units. More particularly, the present invention relates to an electronic control unit comprising a voltage step-up device.

The electronic control units of modern motor vehicles are supplied with voltage step-up devices used to temporarily raise a voltage delivered by the battery of the vehicle when the latter is low, for example below 5 volts (V). This usually occurs when the vehicle engine is started (activation of the starter), and notably when the battery is at low temperature (winter) or at the end of its service life. A temporary raising of the voltage is then necessary because a voltage below 5 V is usually insufficient to allow the microcontroller of the electronic control unit to drive the starting of the engine.

Figure 1:
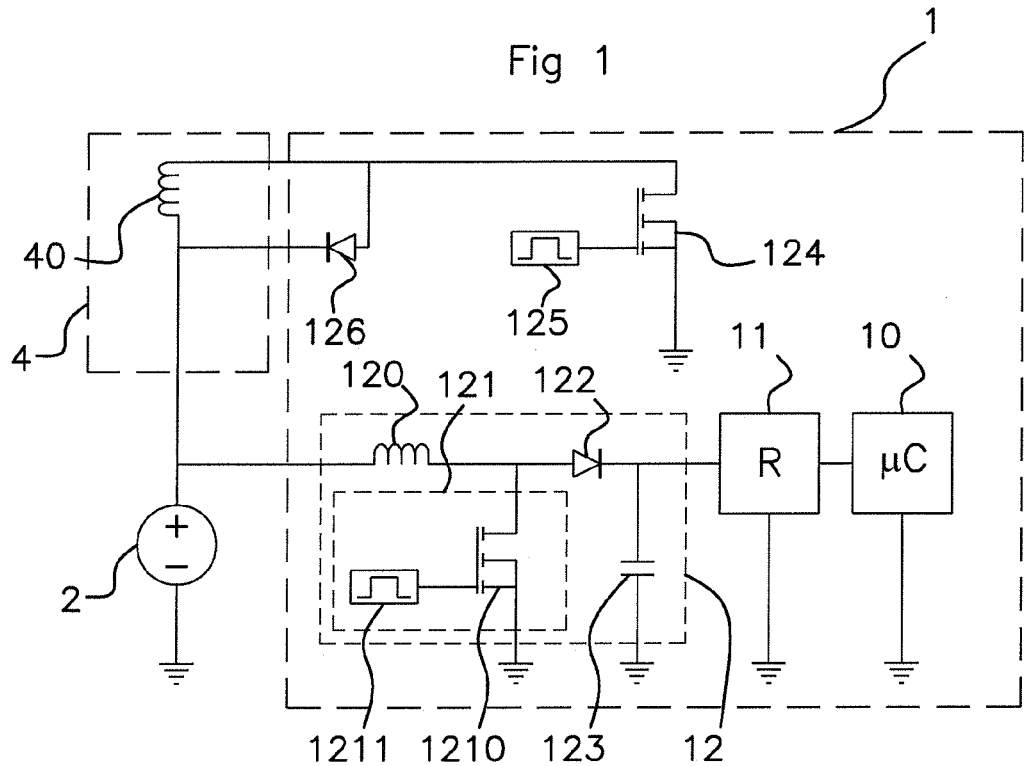

An electronic control unit 1 according to the state of the art is shown schematically in FIG. 1. The electronic control unit 1 coupled to a battery 2 of the motor vehicle comprises a microcontroller 10, a voltage regulator 11 and a voltage step-up device 12.

The voltage step-up device 12 is a switching mode power supply of the "boost converter" type and comprises an inductive load 120 coupled to the battery 2 and control means 121 for controlling the inductive load 120, a diode 122 and a capacitive load 123.

The control means 121 usually comprise a transistor 1210 used as a switch and a control circuit 1211 for controlling the transistor 1210 the operation of which is described below.

In principle, the control circuit 1211 keeps the inductive load 120 deactivated, that is to say that the switch is kept open.

If, when the engine is started, the voltage supply by the battery 2 is insufficient, that is to say below a minimum starting voltage, the control circuit 1211 activates the inductive load 120, that is to say that the switch is alternately closed/open.

When the switch is closed, the inductive load 120 is connected to the electric ground and said inductive load accumulates energy.

When the switch is open, the energy accumulated in the inductive load 120 is discharged to the capacitive load 123 through the diode 122. The voltage at the terminals of the inductive load 120 is added to that supplied by the battery 2 and the voltage at the terminals of the capacitive load 123 is temporarily greater than the voltage supplied by the battery 2.

During accumulation intervals, the diode 122 is switched off and the capacitive load 123 is discharged to the voltage regulator 11.

The control circuit 1211 forms, for the activation of the inductive load 120, a signal of the pulse width modulated type, the frequency of which is chosen depending on the value of the inductance of the inductive load 120 and is usually approximately 100 kHz for an inductance value of 10 μH.

Another example of a voltage step-up device is described in document EP 1 557 561 A1. In this document EP 1 557 561 A1, the voltage step-up device is a DC/DC converter comprising many components: diodes, capacitors, transistors, and coils.

The effectiveness of the voltage step-up devices is known. However, the addition of such a device in an electronic control unit is accompanied by an increase in the number of necessary components, causing an increase in the dimensions of the printed circuit of the electronic control unit and in the electromagnetic interference. The addition of such a device, moreover not much solicited in practice (only on the starting of the engine in certain conditions), therefore has a considerable impact on the final cost of the electronic control unit.

The present invention proposes to solve the abovementioned problems by means of an electronic control unit supplied with a voltage step-up device comprising means for controlling at least one inductive load that is shared with at least one second device that is internal or external to the electronic control unit, a second device of which the operation is controlled by the electronic control unit.

Preferably, the control means of the voltage step-up device also drive the at least one inductive load for the operation of the at least one second device.

Preferably, the at least one second device requires an activation of the at least one inductive load only during intervals subsequent to the starting of the motor vehicle engine.

Preferably, the at least one second device is a variable-geometry turbocharger actuator or a system for draining a gasoline tank of the motor vehicle engine.

The present invention also relates to a method for controlling at least one inductive load comprising:
 a) a step in which the at least one inductive load is activated on the starting of the engine for the operation of the voltage step-up device,
 b) a step in which the at least one inductive load is activated for the operation of the at least one second device during intervals subsequent to the starting of the engine.

Figure 2:
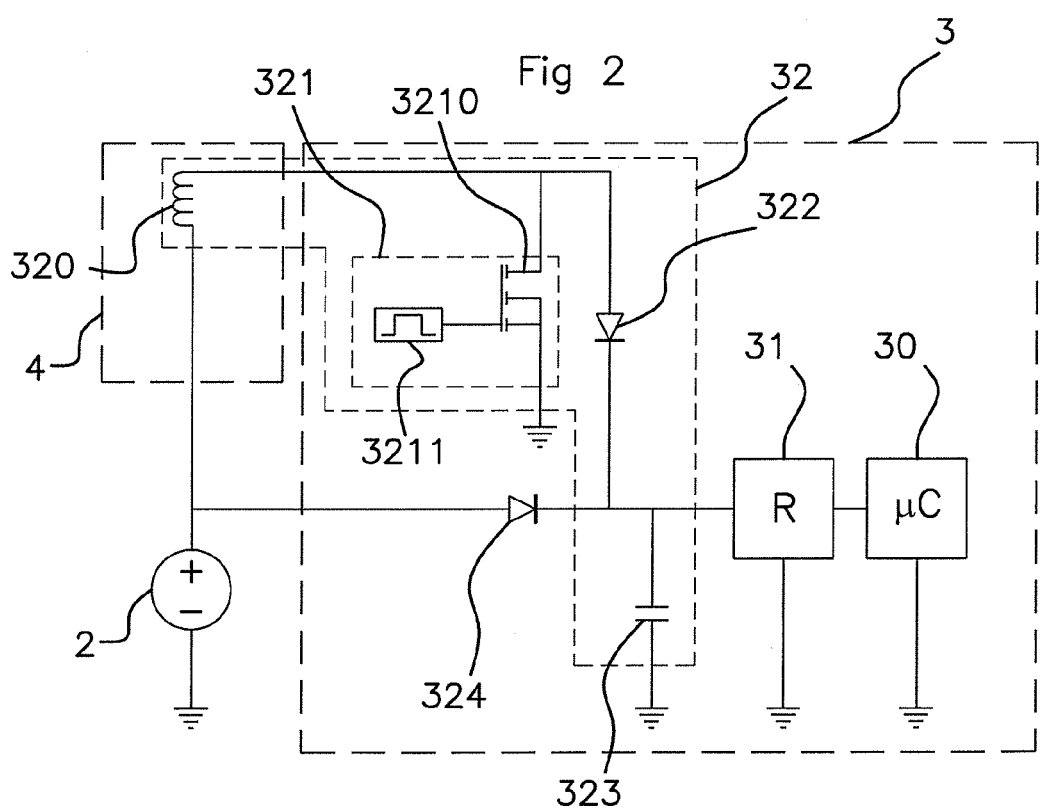

The following description of embodiments of the invention is made with reference to the figures that represent in a nonlimiting manner:

FIG. 1: a schematic diagram of an electronic control unit with a voltage step-up device according to the prior art, FIG. 2: a schematic diagram of an electronic control unit comprising a voltage step-up device according to the invention.

FIG. 2 represents schematically a preferred embodiment of an electronic control unit 3 according to the invention which comprises a microcontroller 30 controlling the operation of the vehicle engine, a voltage regulator 31 and a voltage step-up device 32.

The microcontroller 30 is supplied with voltage by an electric power source, in this instance the battery 2 of the vehicle. The voltage supplied by the battery 2 varies over time and is regulated by the voltage regulator 31 the function of which is to supply a substantially constant voltage to the microcontroller 30, for example approximately 5 V.

According to the invention, the voltage step-up device comprises control means 321 for controlling an inductive load 320 which is shared with a second device 4, said inductive load and said second device being external to the electronic control unit 3 in the nonlimiting example shown in FIG. 2.

The second device 4 corresponds to a device of the engine or of the motor vehicle comprising inductive loads driven by the electronic control unit 3. This is the case, for example, of actuators of variable-geometry turbochargers, of the system for draining the gasoline tank, of the fuel injectors, etc.

Preferably, the control means 321 are also shared between the voltage step-up device 32 and the second device 4, and said control means activate the inductive load 320 either for the operation of said voltage step-up device or for the operation of said second device.

The control means 321 comprise a transistor 3210 used as a switch and a control circuit 3211 for controlling the transistor 3210, which elements drive the activation of the inductive load 320.

An activation of the inductive load 320 associated with the operation of the voltage step-up device 32 consists, as described above, in successive energy accumulations/discharges by the inductive load 320, the discharges being made through a diode 322 and to a capacitive load 323 which is discharged in its turn progressively to the voltage regulator 31 when the inductive load 320 accumulates energy.

An activation of the inductive load 320 associated with the operation of the second device 4 consists, depending on the type of device in question, either in successive energy accumulations/discharges as for the voltage step-up device 32, or in a simple passage of the transistor 3210 from an off state (switch open) to an on state (switch closed).

In order not to disrupt the starting of the engine, the second device 4 is preferably a device connected to the electronic control unit 1 in which the driving of the inductive load 320 is not necessary to start the engine, for example a variable-geometry turbocharger actuator, the system for draining the gasoline tank, an on/off valve, etc.

In another preferred embodiment, not shown in the figures, the second device 4 and the inductive load 320 are internal to the electronic control unit 3. It may be for example a filtering inductor of a function internal to the electronic control unit 3 which does not have to be driven in order to start the engine.

Compared with the electronic control unit 1 according to the prior art, shown in FIG. 1, it can be seen that the invention makes it possible to save mainly three components, since the inductive load 320, the transistor 3210 and the control circuit 3211 are shared, whereas before they were duplicated for the second device 4 (40, 124 and 125) and the voltage step-up device 12 (120, 1210, 1211).

In the electronic control unit 3 according to the invention, the number of diodes is unchanged since the diode 322, which corresponds for example to the diode 126 of FIG. 1, connects the inductive load 320 and the capacitive load 323, and since a diode 324 is preferably inserted between the battery 2 and the capacitive load 323 in order to power the microcontroller 30 when the inductive load 320 is activated for the second device 4.

The invention also relates to a method for controlling the inductive load 320, shared between the voltage step-up device 32 and the second device 4. The method mainly comprises two steps:

a) a control step on starting of the vehicle engine,
b) a control step subsequent to starting the engine.

During step a), the inductive load 320 is driven for the operation of the voltage step-up device 32. Step a) preferably comprises the following substeps:

a substep prior to starting the engine in which the voltage supplied by the battery 2 is compared with the minimum starting voltage,
a conditional substep, executed if the voltage supplied by the battery 2 is less than the minimum starting voltage, in which the inductive load 320 is activated.

During step b), the inductive load 320 is activated for the operation of the second device 4.

More generally, the invention is not limited to the use of a single inductive load: several inductive loads are, in variant embodiments not shown, shared between the voltage step-up device 32 and a plurality of second devices, each second device being internal or external to the electronic control unit 3.

The invention is particularly advantageous because it makes it possible to save at least three electronic components compared with the prior art, which results in a reduction in manufacturing cost of the electronic control unit 3 and a reduction in the number of failures per electronic control unit 3. This reduction in the number of components also results in a reduction in the surface area of the printed circuit supporting the electronic control unit 3, which is advantageous in view of a miniaturization of said electronic control unit, and also in a reduction in the electromagnetic pollution generated by the electronic control unit 3.

The invention claimed is:

1. An electronic control unit (3) for a motor vehicle comprising:
  a microcontroller (30) which controls the operation of an engine of the motor vehicle,
  a regulator (31) of a voltage delivered to the microcontroller (30) by an electric power source (2),
  a voltage step-up device (32) comprising control means (321) suitable for activating at least one inductive load (320) coupled to the power source (2), an activation which consists of successive energy accumulations and discharges by said at least one inductive load, the at least one inductive load is not necessary to start an engine of the motor vehicle,
  wherein the at least one inductive load (320) is shared with at least one second device (4) that is internal or external to the electronic control unit (3), and operation of the at least one second device is controlled by said electronic control unit.

2. The electronic control unit (3) as claimed in claim 1, wherein the control means (321) of the voltage step-up device (32) drive the activation of the at least one inductive load (320) for the operation of the at least one second device (4).

3. The electronic control unit (3) as claimed in claim 1, wherein the at least one second device (4) requires an activation of the at least one inductive load (320) only during intervals subsequent to the starting of the motor vehicle engine.

4. The electronic control unit (3) as claimed in claim 2, wherein the at least one second device (4) requires an activation of the at least one inductive load (320) only during intervals subsequent to the starting of the motor vehicle engine.

5. The electronic control unit (3) as claimed in claim 1, wherein the at least one second device (4) is a variable-geometry turbocharger actuator or a system for draining a gasoline tank of the motor vehicle engine.

6. Method for controlling at least one inductive load (320) coupled to an electric power source (2) of a motor vehicle, comprising:
  a) a step in which the at least one inductive load (320) is activated by control means (321) for the operation of a device (32) for stepping up a voltage supplied to a microcontroller (30) of an electronic control unit (3) of the motor vehicle, the at least one inductive load is not necessary to start an engine of the motor vehicle, and
  b) a step in which the at least one inductive load (320) is activated for the operation of at least one second device (4) that is internal or external to the electronic control unit (3), during intervals subsequent to the starting of the motor vehicle engine.

7. The method as claimed in claim 6, wherein the control means (321) of the voltage step-up device (32) drive the activation of the at least one inductive load (320) for the operation of the at least one second device (4).

* * * * *